(12) United States Patent
Doedens

(10) Patent No.: US 12,531,400 B2
(45) Date of Patent: Jan. 20, 2026

(54) OPTICAL PROFILOMETRY ON HV CABLE ENDS AND ON SAMPLES EXTRACTED FORM HV CABLES

(71) Applicant: NEXANS, Courbevoie (FR)

(72) Inventor: Espen Doedens, Halden (NO)

(73) Assignee: NEXANS, Courbevoie (FR)

( * ) Notice: Subject to any disclaimer, the term of this patent is extended or adjusted under 35 U.S.C. 154(b) by 489 days.

(21) Appl. No.: 17/973,363

(22) Filed: Oct. 25, 2022

(65) Prior Publication Data
US 2023/0132865 A1    May 4, 2023

(30) Foreign Application Priority Data
Oct. 29, 2021   (EP) ..................................... 21306532

(51) Int. Cl.
*H02G 1/14* (2006.01)
*H02G 1/12* (2006.01)

(52) U.S. Cl.
CPC ................. *H02G 1/14* (2013.01); *H02G 1/12* (2013.01)

(58) Field of Classification Search
CPC .................................... H02G 1/12; H02G 1/14
See application file for complete search history.

(56) References Cited

U.S. PATENT DOCUMENTS

| 11,404,800 | B2* | 8/2022 | Johansson | H01R 4/029 |
| 12,198,326 | B2* | 1/2025 | Francis | G06T 7/001 |
| 2017/0229797 | A1* | 8/2017 | Wurm | H01R 11/28 |
| 2019/0013559 | A1* | 1/2019 | Suenaga | H01P 3/06 |
| 2019/0013560 | A1* | 1/2019 | Suenaga | H01P 11/005 |

FOREIGN PATENT DOCUMENTS

| JP | H06 178422 | | 6/1994 | |
| JP | 2000152453 | A * | 5/2000 | |
| JP | 2007124837 | A * | 5/2007 | |
| JP | 2020117754 | A * | 8/2020 | H01B 13/06 |
| WO | WO-2012167821 | A1 * | 12/2012 | H02G 5/066 |
| WO | WO-2020132502 | A1 * | 6/2020 | H02G 1/1265 |

OTHER PUBLICATIONS

Translation of JP-2007124837-A (Year: 2007).*
Translation of JP-2000152453-A (Year: 2000).*
Translation of JP-2020117754-A (Year: 2020).*
Doedens Espen et al: "Space Charge Accumulation at Material Interfaces in HVDC Cable Insulation Part I—Experimental Study and Charge Injection Hypothesis", Energies, vol. 13, No. 8, Apr. 17, 2020.
European Search Report dated Apr. 7, 2022.

* cited by examiner

*Primary Examiner* — Jeffrey T Carley
(74) *Attorney, Agent, or Firm* — CANTOR COLBURN LLP

(57) ABSTRACT

A method is provided for preparing an uncovered insulation layer surface of an end section of a cable using optical profilometry, the uncovered insulation layer surface having an advantageous low roughness, a method for jointing two cables. A method is also provided for preparing a termination assembly on a cable, a cable end, a joint and a termination assembly.

9 Claims, 2 Drawing Sheets

OPTICAL PROFILOMETRY ON HV CABLE ENDS AND ON SAMPLES EXTRACTED FORM HV CABLES

RELATED APPLICATION

This application claims the benefit of priority from European Patent Application No. 21 306 532.9, filed on Oct. 29, 2021 the entirety of which is incorporated by reference.

FIELD OF THE INVENTION

The present invention is within the field of surface inspection of HV cables.

BACKGROUND

High voltage cables usually comprise an electric conductor and an insulation system surrounding the electric conductor, the insulation system comprising an inner semiconducting layer, an insulating layer and an outer semiconducting layer. High voltage can be applied with alternating current (HVAC) or direct current (HVDC).

The quality of the joints between two HV cables is dependent on the quality of the surface at the interface between the cable and the joint, that is to say the surface of the insulation material. For these joints, a rough insulation surface has been proven to be detrimental, in that rough surfaces tend to give rise to low DC breakdown strength and thus poor performance. For AC the same rough surfaces have proved to feature similar strong field enhancement and roughness is thus detrimental for both HVAC and HVDC applications.

As such surface quality inspection of the on-site manufactured cable insulation layer surface before jointing is important.

Today surface quality inspection on site is carried out with the human eye, and in case of encountering deviations, regular photographs are taken. A disadvantage of a visual inspection is that it is user dependent and does not provide for a reliable and standardized quality measurement.

Other methods for inspection of the insulation layer surface before jointing are known. However, a major disadvantage of these methods is that they require a sample to be taken from the surface and consequently damaging it. The size of the sample and the requirement of taking the sample from a part of the surface away from the cable transition area will also limit its representation of the quality of the total insulation layer surface area.

OBJECTS AND SUMMARY OF THE INVENTION

One objective of this invention is to overcome the drawbacks of the known technology.

The present invention is defined by the appended claims and in the following:

In a first aspect, the invention relates to method for preparing a cable end of a cable for transition, wherein the cable comprises an electric conductor and an insulation system surrounding the electric conductor, the insulation system comprising an inner semiconducting layer, an insulating layer and an outer semiconducting layer, the method comprising a step of:

a. removing the outer semiconducting layer and optionally part of the insulation layer, from an end section of the cable, providing an uncovered insulation layer surface on the end section of the cable;

The skilled person may use any suitable known technique for this removal step. For example these surfaces may be prepared using a designated tool, such as peeling and stripping tools, sanding, glassing, etc.

b. measuring the surface roughness of the obtained uncovered insulation layer surface by optical profilometry and deriving a measured value of a roughness parameter for the uncovered insulation layer surface;

c. comparing the measured value to a preselected reference value of the same roughness parameter; and if measured value is lower than the preselected reference value then the uncovered insulation layer surface has an acceptable surface quality for transition, and if measured value is higher than the preselected reference value for the roughness parameter then the uncovered insulation layer surface does not have an acceptable surface quality and a new uncovered insulation layer surface is prepared, and steps b and c are repeated.

The skilled person will understand that a roughness defining parameter is any mathematical algorithm or equation that derives from the measured surface coordinates, yielding a scalar value or curve that can be used in a comparison against a reference value as an acceptance criteria. For example, amplitude parameters such as Sa, Sq, Ssk, Sku, Sp, Sv, Sz, hybrid parameters such as Sdq, Sdr, Sds, Ssc, other parameters listed in ISO 25178-2, Abott-Firestone curves, histograms, calculation of Field Enhancement Factors.

The skilled person will understand that the measurement should be performed on a representative sample of the surface of interest, for example the measurement may be repeated 1 to 50 times, preferably 2 to 30 times, preferably 5 to 20 times, preferably about 10 times within the area of interest as spot measurements at randomly selected locations and/or on areas which appear less glossy to the naked eye.

In an embodiment of the method, the new uncovered insulation layer surface is prepared by cutting the end section of the cable and repeating step a.

Here the skilled person will understand that cutting the end section means cutting the part of the cable comprising the end section.

In an embodiment of the method, the new uncovered insulation layer surface is prepared by removing part of the insulation layer, from an end section of the cable, providing a new uncovered insulation layer surface on the end section of the cable.

In an embodiment of the method, the surface roughness of the obtained uncovered insulation layer surface measured in step b is measured in situ by use of a portable optical profilometry apparatus.

In an embodiment of the method, the roughness parameter may be Sa.

In an embodiment of the method, the preselected reference value for the roughness parameter $Sa_{ref}$ may be 800 nm. In another embodiment $Sa_{ref}$ may be 600 nm. In another embodiment $Sa_{ref}$ may be 400 nm. In another embodiment $Sa_{ref}$ may be 200 nm.

In an embodiment of the method, the roughness parameter may be Sdq.

In an embodiment of the method, the preselected reference value for the roughness parameter $Sdg_{ref}$ may be equal to 0.8. In another embodiment $Sdg_{ref}$ may be 0.6. In another embodiment $Sdg_{ref}$ may be 0.4. In another embodiment $Sdg_{ref}$ may be 0.2.

The reference values $Sdg_{ref}$ and $Sa_{ref}$ are selected to be the threshold values of an acceptable (or suitable) surface roughness. The skilled person will understand that these values are application dependent.

In a second aspect, the invention relates to a method of jointing a first cable and a second cable, the first cable and the second cable comprising an electric conductor and an insulation system surrounding the electric conductor, the insulation system comprising an inner semiconducting layer, an insulating layer and an outer semiconducting layer, the method comprising the steps of:
  a. preparing an uncovered insulation layer surface at a cable end for at least one of the first and the second cables, according to the first aspect of the invention;
  b. jointing the cable end sections.

In an embodiment of the second aspect of the invention the uncovered insulation layer surface may be prepared at a cable end for both the first and the second cables.

In an embodiment of the second aspect of the invention, the jointing step may be realised using a pre-molded joint.

In a third aspect, the invention relates to a method for preparing a termination assembly on a cable, the cable comprising an electric conductor and an insulation system surrounding the electric conductor, the insulation system comprising an inner semiconducting layer, an insulating layer and an outer semiconducting layer, the method comprising the steps of:
  a. preparing an uncovered insulation layer surface at a cable end, according to the method according to the first aspect of the invention;
  b. mounting a termination assembly on the uncovered insulation layer surface.

In an embodiment of the third aspect of the invention, the mounting a termination assembly step is realised using a pre-molded termination assembly.

In a fourth aspect, the invention relates to a cable, comprising a cable end, obtainable by the method according to the first aspect of the invention.

In a fifth aspect, the invention relates to a joint between a first and a second cable, obtainable by the method according to the second aspect of the invention.

In a sixth aspect, the invention relates to a termination assembly on a cable, obtainable by the method according to the third aspect of the invention.

BRIEF DESCRIPTION OF THE DRAWINGS

In the following description this invention will be further explained by way of exemplary embodiments shown in the drawings.

DETAILED DESCRIPTION OF THE INVENTION

The quality of cable transitions, such as cable termination assemblies and joints between two HV cables is dependent on the quality of the surface at the interface between the cable and the joint, that is to say the surface of the insulation material. For these transitions, a rough insulation surface has been proven to be detrimental, in that, rough surfaces tend to give rise to low DC breakdown strength and thus poor performance. For AC the same rough surfaces have proved to feature similar strong field enhancement and roughness is thus detrimental for both HVAC and HVDC applications.

Figure 1:
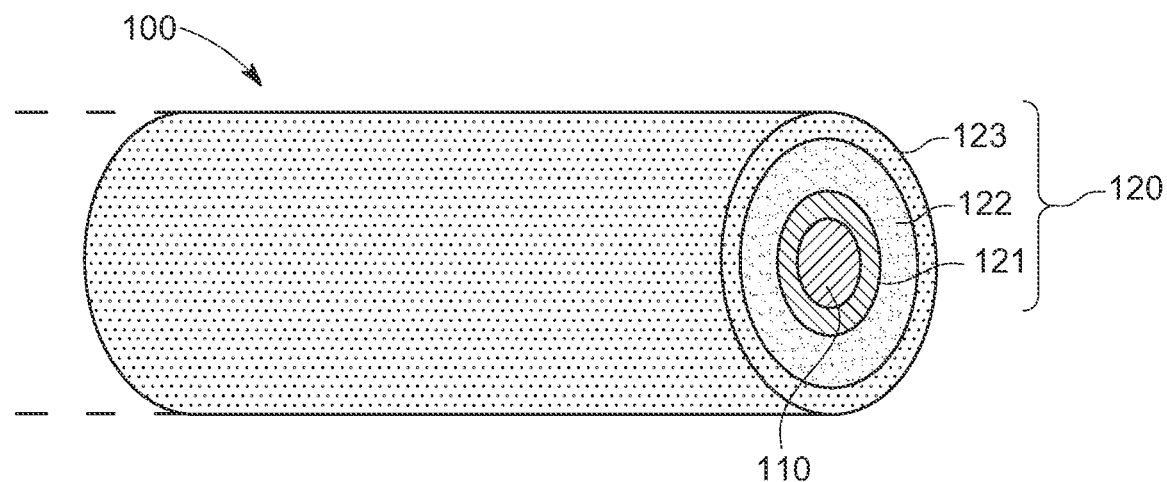
FIG. 1 is a perspective view of a typical cable structure
Figure 2:
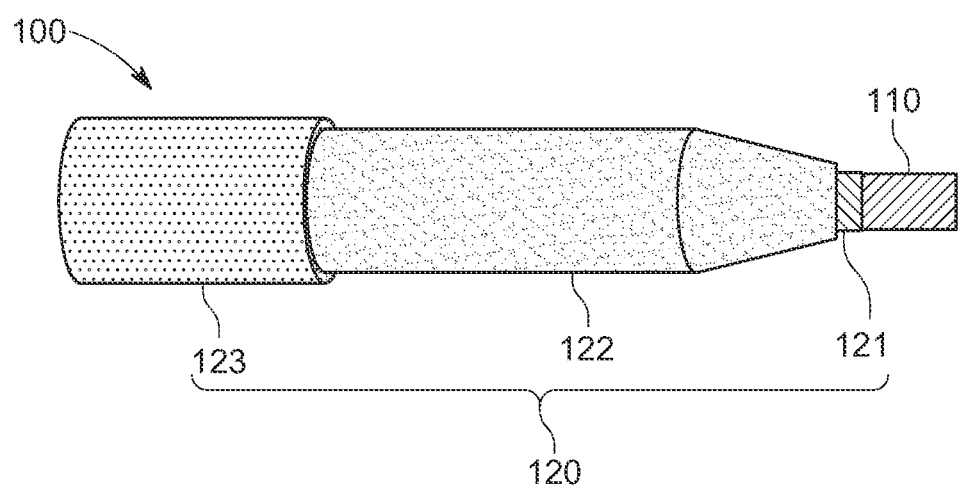
FIG. 2 is a perspective view a cable end prepared to be transitioned

In the preparation of a cable transition, that is to say the transition from a cable end to another element, such as in cable termination assemblies and joints, a first electric cable 100 is provided, the first cable 100 comprising an electric conductor 110 and an insulation system 120 surrounding the electric conductor 110, the insulation system 120 comprising an inner semiconducting layer 121, an insulating layer 122 and an outer semiconducting layer 123. Other layers, such as sheathing, water barriers, etc. may also be present on the cable. This cable is illustrated in FIG. 1.

The end section of the cable 100 is prepared for having a transition element 300, such as a joint or termination assembly mounted over it. This is done according to known techniques. For example, these surfaces may be prepared using a designated tool, sanding, glassing, etc. Typical examples of peeling & stripping tools are the CP series from Hivotec and the AMSI from Alroc. See also the co-pending application "method to minimize roughness on cable end insulation surfaces". In other words, for a certain distance, the outer semiconducting layer 123 and other outer layers (over the outer semiconducting layer), as well as some of the insulation layer 122 are removed. This provides an uncovered insulation layer surface 125 on the end section of the cable 100.

In case of jointing, a second cable 200 is provided, the second cable 200 comprises an electric conductor 210 and an insulation system 220 surrounding the electric conductor 210, the insulation system 220 comprising an inner semiconducting layer 221, an insulating layer 222 and an outer semiconducting layer 223. Other layers, such as sheathing, water barriers . . . may also be present on the cable. The end section of the second cable 200 is prepared using the same or a similar method as for the first cable 100; also yielding an uncovered insulation layer surface 225 on the end section of the second cable 200.

Today, on site surface quality inspection of the uncovered insulation layer surface 125;225 is carried out with the human eye, and in case of encountering deviations, photographs are taken with a film or digital camera.

However, this method does not allow for a proper characterization of the uncovered insulation layer surface 125; 225 that is not user dependent.

It is proposed here to use profilometry to characterize the uncovered insulation layer surface 125;225.

Contact profilometry, such as 2d-profilometry comprising a needle stylus dragging the surface, may in principle be used on the uncovered insulation layer surface 125;225 but this method may scratch the surface itself and may not detect the full attributes of the uncovered insulation layer surface 125;225.

Different types of optical profilometry use light sources and are able to scan the surface topography in 3D.

It is possible to extract samples from the insulation layer 122 of the cable end, close to the area that will be part of the cable transition, but not in it. These sample may then be brought to the lab for profilometry. However, even though this method is advantageous, taking these samples is a destructive method and introduces time lag between cable transition creation and inspection completion.

Recent progress in optical profilometry have yielded portable optical profilometer that allow for the measurement to be done in the field, avoiding taking a sample, skipping the time lag, allowing for an on-site characterization of the uncovered insulation layer surface 125;225, even before making the cable transition, e.g. a joint or a termination assembly, allowing for possible improvement of the uncovered insulation layer surface 125;225.

Optical Profilometry with a Portable or Semi Portable Device

A semi portable or portable optical profilometer suitable for scanning the surface of a cable (2D and 3D surface measurement) is provided, for example the Jr25 from Nanovea. The suitable profilometer preferably provides a sufficient resolution that will reveal most of the micro texture, typically resolution around µm level. Each pixel corresponds preferably to less than 10 µm$^2$, more preferably less than 5 µm$^2$ or even more preferably less than 1 µm$^2$. Height wise accuracy is preferably below 50 nm, more preferably below 10 nm, even more preferably below 1 nm.

Then the optical profilometer is placed directly on the lateral surface of the uncovered insulation layer surface 125;225 of the cable 100;200, at a distance from the newly exposed insulation surface suitable for scanning (depends on the instrument). The lateral surface of the insulation layer of the cable is scanned, obtaining measurement data, namely the surface height distribution as a function of the position (x,y), (Z(x,y)).

Preferably, scan area for each point may vary from 5×5 micrometer to 50×50 cm, the upper bound being only limited by the huge amount of data that can be processed in a timely manner.

The scan resolution (distance between each datapoint in the measurement) may preferably vary from 5 nm steps to 5 µm steps.

An end section of a cable 100;200 may contain several meters of uncovered insulation layer surface 125;225. The area of interest for analysis is the 1 m section closest to the section where the electric conductor 110;210 is exposed.

The measurement is then repeated 1 to 50 times, preferably 2 to 30 times, preferably 5 to 20 times, preferably about 10 times within the area of interest as spot measurements at randomly selected locations and/or on areas which appear less glossy to the naked eye.

Features in the surface texture can be quantified using roughness parameters, which represent features in a certain measurement domain with a single parameter value, thus facilitating direct comparisons of certain surface types. The average roughness (or arithmetical mean height variation) of a certain 3D surface is quantified through Sa, expressed as:

$$Sa = \iint_a |Z(x,y)| dx dy$$

where Z(x,y) represents a matrix of 3D coordinates on the surface, with Z expressing the local distance from the mean plane in m. Another relevant parameter, the root mean square (RMS) roughness Sq, is expressed as:

$$Sq = \sqrt{\iint_a (Z(X,Y))^2 dx dy}$$

Sa and Sq parameters, in m, are useful for comparing the height in the surface texture. However, two surface types having identical Sa and Sq parameter values can have vastly different textures, as the texture's spacing can be present with different widths. Therefore, a third parameter, the unitless RMS surface slope Sdq, is introduced as:

$$Sdq = \sqrt{\frac{1}{A}\int_0^{Lx}\int_0^{Ly}\left(\frac{\partial Z(x,y)}{\partial x}\right)^2 + \left(\frac{\partial Z(x,y)}{\partial y}\right)^2 dx dy}$$

where A is the area of the measurement domain in m$^2$, Lx and Ly are respectively the x and y length of the investigated domain in m. The Sdq parameter thus quantifies the steepness in the surface texture (i.e. with Sdq=0 for a fully flat surface and Sdq=1 for all gradient components at 45θ incline) and is sensitive to both the amplitude and spacing in the surface texture. By using both Sa and Sdq parameters in surface type comparisons, a texture sensitive analysis is made covering most surface types.

The surface roughness of the uncovered insulation layer surface 125;225 is measured using optical profilometry as explained above (see also ISO 25178), and Sdq and/or Sa values are calculated for the uncovered insulation layer surface 125;225. These values are compared to reference values, to determine if the quality of the surface is sufficient to proceed further with preparing a cable transition.

if $Sdq < Sdq_{ref}$ or $Sa < Sa_{ref}$, then the uncovered insulation layer surface 125;225 has a satisfying surface quality and the cable transition may be further prepared, if $Sdq > Sdg_{ref}$ and/or $Sa > Sa_r er$, then the uncovered insulation layer surface 125;225 does not have a satisfying surface quality. A new surface may be prepared using known methods, or the prepared cable end may be cut and a new cable end may be prepared.

The measurement data may also be stored for future reference, which can be traced back if any deviations occur for the particular cable accessory during its 40-years lifetime.

When the cable end meets the quality criteria, the cable end may then be transitioned, e.g. jointed to another cable end or termination, using known methods. The method of preparing a cable end is particularly relevant for transitions involving a physical interface, in particular for method using a pre-molded transition element 300, such as a pre-molded joint or a pre-molded termination assembly.

The pre-molded transition element 300 typically comprises an electric transition element to connect the electric conductor 110;210 to a further conductor element and an insulation system surrounding the electric transition element 310, the insulation system comprising an inner semiconducting layer 321, an insulating layer 322 and an outer semiconducting layer 323.

In a joint, the electric transition element may for example be a ferrule or any other suitable element known in the art.

The skilled person will understand here that a physical interface here refers to an interface between to solid surfaces, for example between a surface of a cable end and a pre-molded joint, whereas a chemical interface refers to a interface between a surface of a cable end and a non-solid surface, for example a melted insulation layer extruded on top of the cable end. Here the physical interface is the interface between the uncovered insulation layer surface 125;225 of the cable 100;200 and the inner surface of the insulating layer 321 of the transition element 300.

Figure 3:
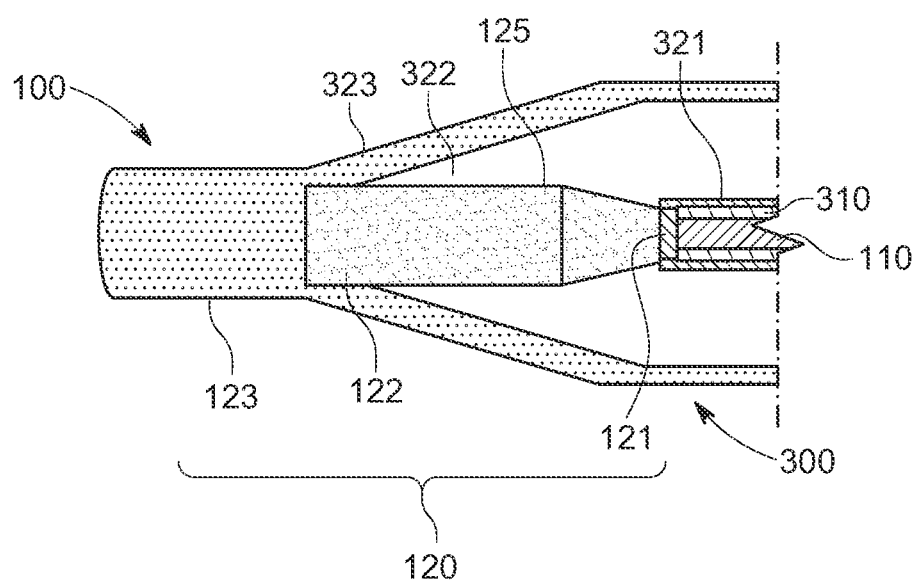
FIG. 3 is a side view of a cable end in a joint or termination assembly.

The obtained physical interface, between a cable end and a pre-molded joint or a pre-molded termination assembly is illustrated in FIG. 3.

This specific procedure creates a fool-proof quality control of insulation roughness introduced into high voltage cable accessories, such as any kind of joint or termination assembly. Also full traceability is gained over quality of work for all installations for each specific cable project. Ensuring that roughness levels, and thus the level of local field enhancement is below a certain value, is detrimental for guaranteeing that locally enhanced ageing rates may be present and that the accessory will last its specified life time without break down of the insulation system.

Optical Profilometry at an Offsite Laboratory

When it is not possible to perform the analysis on site, or when it is preferable to analyze a series of samples on an offsite laboratory, a sample may be taken from the uncovered insulation layer surface 125;225 of the cable adjacent to the uncovered insulation layer surface 125;225 in the area to be transitioned and analyzed offsite.

A surface sample of the insulation surface from an area adjacent to the insulation surface going into the jointing accessory is cut, for example using a knife. This sample can be a cut cable section of length 1 to 500 cm and a width of 1 to 20 cm, or any slap of insulation cut or machined of containing a piece of the original surface. This sample is sent to the offsite laboratory where the profilometer is situated. The lab may then perform the same analysis as above.

This method may provide a standardized quality measurement providing traceable data. However, a disadvantage of this method is that the quality criteria is commonly evaluated after the joint has already been buried or installed. Whenever the quality is not considered to be satisfying, the entire cable may need to be brought up again and a new section is jointed in replacing the joint that did not meet the criteria.

The invention claimed is:

1. A method for preparing a cable end of a cable for transition, wherein the cable has an electric conductor and an insulation system surrounding the electric conductor, the insulation system comprising an inner semiconducting layer, an insulating layer and an outer semiconducting layer, the method comprising:
    removing the outer semiconducting layer from an end section of the cable, thereby providing an uncovered insulation layer surface on the end section of the cable; and
    measuring a surface roughness of the uncovered insulation layer surface by optical profilometry and deriving a measured value of a roughness parameter for the uncovered insulation layer surface;
    comparing the measured value to a preselected reference value of the same roughness parameter;
        determining that the measured value is higher than the preselected reference value for the roughness parameter and that the uncovered insulation layer surface does not have an acceptable surface quality;
        preparing a new uncovered insulation layer surface by one of:
            cutting the end section of the cable to provide a new cable end and removing the outer semiconducting layer from the new end section of the cable, thereby providing the new uncovered insulation layer surface on the new end section of the cable; or
            removing part of the insulation layer from the end section of the cable, thereby providing the new uncovered insulation layer surface;
    measuring the surface roughness of the new uncovered insulation layer surface by optical profilometry and deriving a measured value of the roughness parameter for the new uncovered insulation layer surface;
    comparing the measured value to a preselected reference value of the same roughness parameter; and
    determining that the measured value is lower than the preselected reference value for the roughness parameter and that the new uncovered insulation layer surface has an acceptable surface quality for transition.

2. The method according to claim 1, wherein the surface roughness of the obtained uncovered insulation layer surface is measured in situ by use of a portable optical profilometry apparatus.

3. The method according to claim 1, wherein the roughness parameter is the average roughness, Sa, expressed as:

$$Sa = \iint_a |Z(x,y)| dx dy$$

where $Z(x,y)$ represents a matrix of 3D coordinates on the surface, with Z expressing the local distance from the mean plane in m.

4. The method according to claim 3, wherein the preselected reference value for the roughness parameter $Sa_{ref}$ is one of: 800 nm, 600 nm, 400 nm, or 200 nm.

5. The method according to claim 1, wherein the roughness parameter is the unitless RMS surface slop, Sdq, expressed as:

$$Sdq = \sqrt{1/A \int_0^{Lx} \int_0^{Ly} (\partial Z(x,y)/\partial x)^2 + (\partial Z(x,y)/\partial y)^2 dx dy}$$

where A is the area of the measurement domain in m$^2$, Lx and Ly are respectively the x and y length of the investigated domain in m.

6. The method according to claim 5, wherein the preselected reference value for the roughness parameter $Sdg_{ref}$ is one of: 0.8, 0.6, 0.4, or 0.2.

7. The method of claim 1 comprising:
    jointing the end sections of the cable to an end section of a second cable having an electric conductor and an insulation system surrounding the electric conductor, the insulation system comprising an inner semiconducting layer, an insulating layer and an outer semiconducting layer.

8. The method of claim 7 wherein an uncovered insulation layer surface is prepared at an end section of the second cables.

9. The method of claim 8, wherein the jointing step is realized using a pre-molded joint.

* * * * *